No. 793,980. PATENTED JULY 4, 1905.
H. W. BOLENS.
CHAIR BASE HUB.
APPLICATION FILED JAN. 18, 1904.

3 SHEETS—SHEET 1.

Witnesses
Geo. W. Young.
N. E. Oliphant.

Inventor
Harry W. Bolens,
By H. G. Underwood
Attorneys

No. 793,980. PATENTED JULY 4, 1905.
H. W. BOLENS.
CHAIR BASE HUB.
APPLICATION FILED JAN. 18, 1904.
3 SHEETS—SHEET 2.
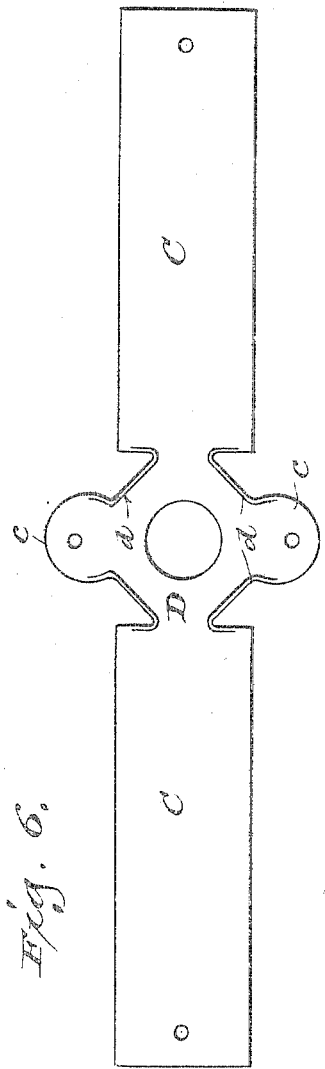
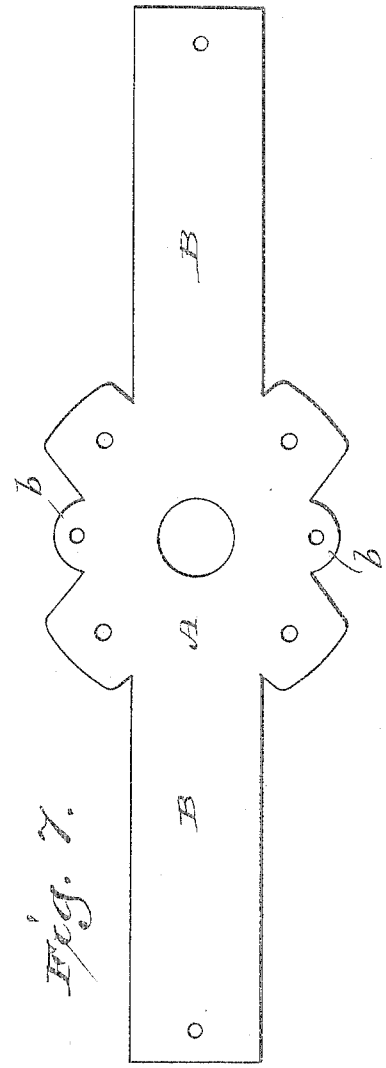

No. 793,980. PATENTED JULY 4, 1905.
H. W. BOLENS.
CHAIR BASE HUB.
APPLICATION FILED JAN. 18, 1904.
3 SHEETS—SHEET 3.
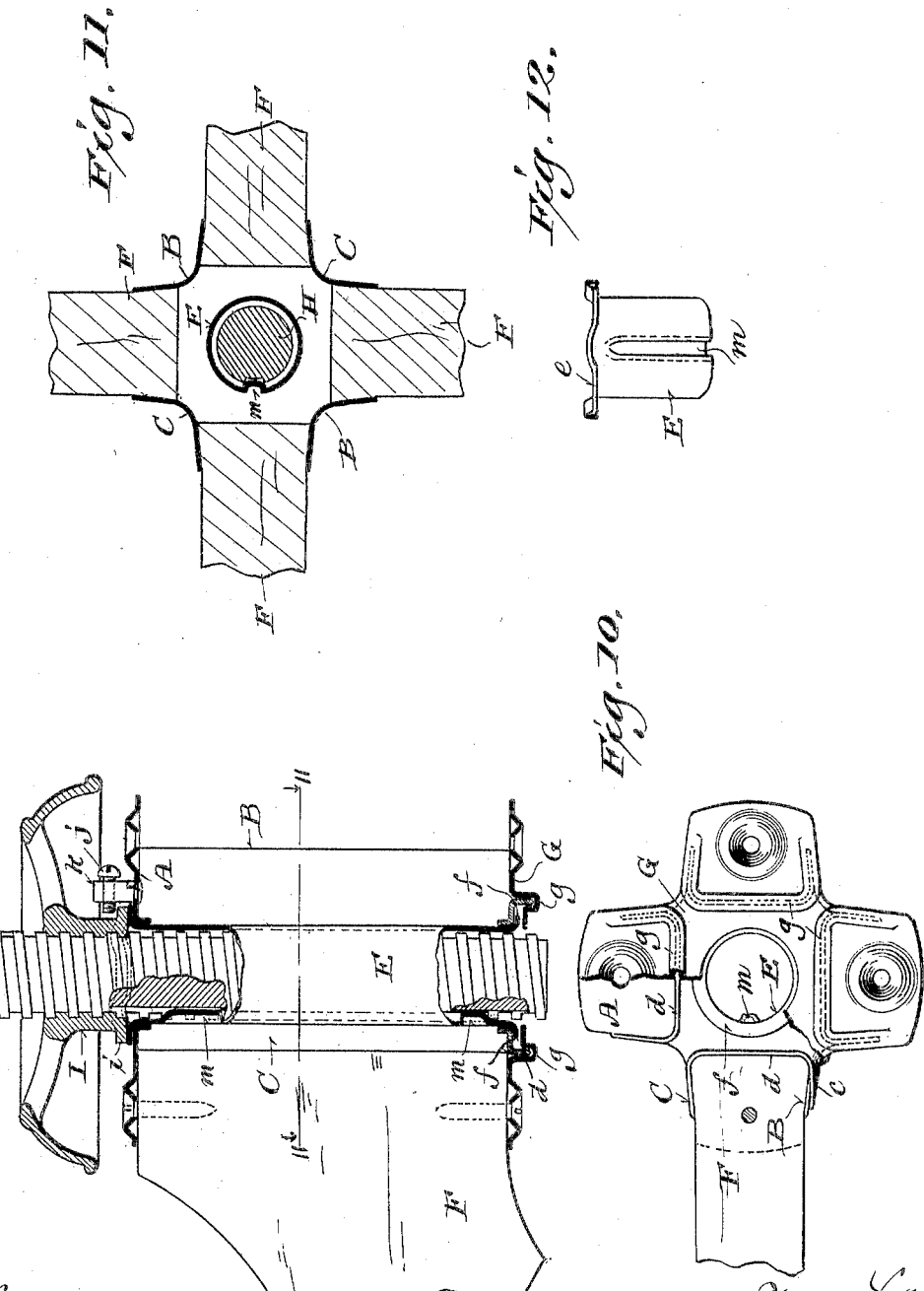
Witnesses
Geo. W. Young.
N. E. Oliphant.
Inventor
Harry W. Bolens,
By H. G. Underwood
Attorneys No. 793,980.

Patented July 4, 1905.

UNITED STATES PATENT OFFICE.

HARRY W. BOLENS, OF PORT WASHINGTON, WISCONSIN.

CHAIR-BASE HUB.

SPECIFICATION forming part of Letters Patent No. 793,980, dated July 4, 1905.

Application filed January 18, 1904. Serial No. 189,462.

*To all whom it may concern:*

Be it known that I, HARRY W. BOLENS, a citizen of the United States, and a resident of Port Washington, in the county of Ozaukee and State of Wisconsin, have invented certain new and useful Improvements in Chair-Base Hubs; and I do hereby declare that the following is a full, clear, and exact description thereof.

My invention has for its object to provide simple, economical, strong, light, and durable chair-base hubs, said invention consisting in what is hereinafter particularly set forth with reference to the accompanying drawings and subsequently claimed.

Figure 5:
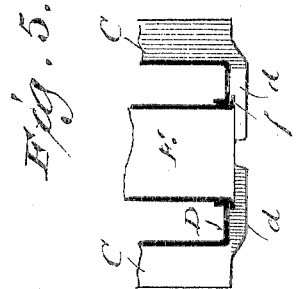
Figure 3:
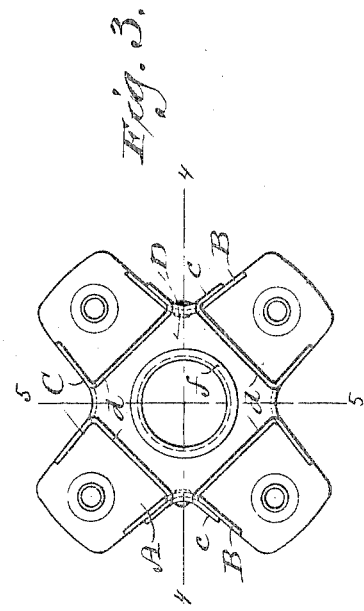
Figure 4:
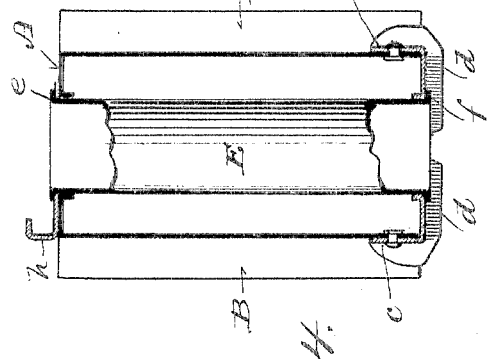
Figure 1:
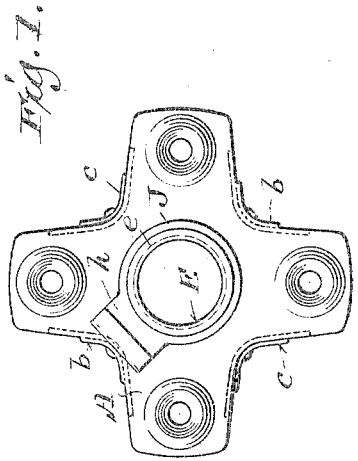
Figure 2:
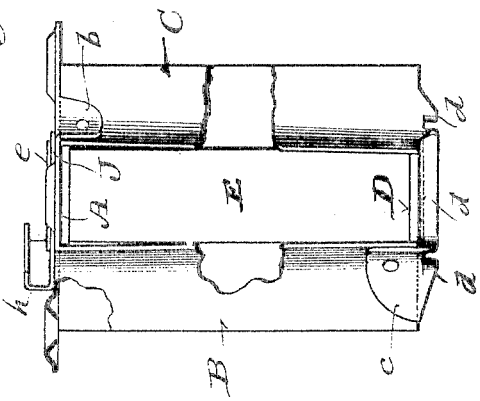

Figure 1 of the drawings represents a plan view of a chair-base hub in accordance with my invention; Fig. 2, an elevation of same, having parts thereof broken away; Fig. 3, a plan view of the hub inverted; Figs. 4 and 5, sectional views, respectively, indicated by lines 4 4 and 5 5 in the third figure; Figs. 6 and 7, plan views of parts of the hub cut from metal plate of suitable gage; Fig. 8, a perspective view of a tube that constitutes part of the hub; Fig. 9, a partly-sectional elevation of a fragment of a chair-base having its hub in accordance with my invention, the tube element of the hub being revoluble and indented to provide a spline that engages a longitudinal groove in a screw-spindle, the adjusting-nut on the spindle being in frictional contact with a waved flange of the tube; Fig. 10, a plan view of the chair-base fragment inverted and partly broken away; Fig. 11, a horizontal section indicated by line 11 11 in the ninth figure, and Fig. 12 an elevation of a portion of the tube having the indentation and waved flange.

Referring by letter to the drawings, A indicates the top of my improved chair-base hub, the same being shown integral with diametrically opposite and preferably partly concavo-convex standards B, that alternate with similar standards C, shown integral with the bottom D of said base, said top and bottom and the standard extensions of the same being cut from ductile metal plate of suitable gage. Bent-down ears $b$, integral with the hub-top A, are riveted to the standards C, and bent-up ears $c$, integral with the hub-bottom D, are likewise connected to the standards B, depending flanges $d$ of said bottom serving to stiffen the same and brace all of the standards.

Extending through central openings in the top and bottom of the above-described frame portion of the hub is a tube E, of ductile metal, having an upper outer suspending flange $e$, and a lower outer flange $f$ is preferably provided on said tube.

The standards of the hub-frame are preferably bent to have outward convergence one with another, and in snug engagement with the spaces between said standards are the flaring ends of wooden legs F, constituting parts of the chair-base of which the hub herein set forth forms a part, these legs being held in place by screws run through preferably countersunk apertures in the hub-top A and in a plate G, this plate being provided with depressions $g$ for the engagement of the flanges $d$ aforesaid.

The central tube of the hub is for the engagement of a spindle H, that may be screw-threaded for vertical adjustment in a nut I, held against vertical displacement by any suitable means. In Figs. 1, 2, and 4 is shown a ring J caught between the tube-flange $e$ and top A of the hub, this ring being provided with an angular radial extension constituting a guard $h$, designed to lap a flange $i$ of said nut, and in Fig. 9 a set-screw $j$ is shown in engagement with a vertical lug $k$, fastened to the hub-top A, this screw being adjustable to overlap the nut-flange.

Various means may be employed to check the tendency of the screw-spindle to automatically descend, and as one means to that end the suspending-flange $e$ of the hub-tube is made to present a waved surface matching a similar surface of the opposing nut.

The hub-tube is shown in Fig. 9 provided with an indented rib $m$, that serves as a spline engaging a longitudinal groove provided in the screw-spindle, and said tube is preferably loose in the hub-frame to rotate with said spindle and nut. It is also practical to provide for rotation of the screw-spindle and its adjusting-nut when the hub-tube is stationary in the hub-frame, and it may be found practical to omit said tube, the spindle in any form being then engageable with central apertures in the top and bottom of said frame, and, if desirable, the metal of said top and bottom may be shaped to form central tubular protuberances in which to guide said spindle.

While I have shown what is probably a preferable detail construction of the hub-frame, it is within the scope of my invention to make all the standards of this frame integral with either the top or bottom of same or in separate pieces, to be fastened at their ends to said top and bottom. It is also within the scope of my invention to provide any upper portion of the hub with waved surface to match similar surface of the spindle-adjusting nut.

Having thus described my invention, what I claim as new, and desire to secure by Letters Patent, is—

1. A chair-base hub in the form of a frame consisting of a top, bottom, standards and means by which the standards are fastened between the top and bottom at suitable intervals apart to serve as walls of spaces in which ends of chair-legs are secured.

2. A chair-base hub-frame consisting of a top, bottom, and standards, suitably connected; and a bottom plate having depressions for reception of depending flanges with which the bottom of said frame is provided.

3. A chair-base hub in the form of a frame consisting of a top, bottom, standards and means by which the standards are fastened to the top and bottom at suitable intervals to serve as walls of spaces in which ends of chair-legs are secured; and a tube extending through said top and bottom central of the same.

4. A chair-base hub in the form of a frame consisting of a top, bottom, standards and means by which the standards are fastened to the top and bottom at suitable intervals to serve as walls of spaces in which ends of chair-legs are secured; and means in the frame for guiding a vertically-adjustable spindle.

5. A chair-base hub in the form of a frame consisting of a top, bottom, standards and means by which ends of the standards are fastened to the top and bottom at suitable intervals apart to serve as walls of spaces in which ends of chair-legs are secured; a vertical tube extending through said top and bottom central of the same, and a spline in the tube.

6. A chair-base hub-frame embodying a top, bottom and standards suitably connected, the standards being at suitable intervals apart to serve as walls of spaces in which ends of chair-legs are secured; and a longitudinally-indented vertical tube central of the frame.

7. A chair-base hub in the form of a frame consisting of a top, bottom, standards and means by which ends of the standards are fastened to the top and bottom at suitable intervals apart to serve as walls of spaces in which ends of chair-legs are secured; a tube loose in said top and bottom central of the same, and a spline in the tube.

8. A chair-base hub in the form of a frame consisting of a top on which waved surface is provided in opposition to similar surface of a nut, a bottom, standards and means by which the standards are fastened to said top and bottom at suitable intervals apart to serve as walls of spaces in which ends of chair-legs are secured.

9. A chair-base hub in the form of a frame consisting of a top, bottom, standards and means by which the standards are fastened between the top and bottom at suitable intervals apart to serve as walls of spaces in which chair-legs are secured; and a nut-guard provided on the frame.

10. A chair-base hub-frame comprising a top having diametrically opposite standard extensions integral therewith, and a bottom integral with standard extensions similar to those aforesaid with which they alternate, the standard extensions of the top being fastened to the bottom and those of said bottom to said top.

11. A chair-base hub comprising a frame consisting of a top having standard extensions, and a bottom having like extensions alternating with those aforesaid, the standard extensions of the top being fastened to the bottom and those of said bottom to said top; and a vertical tube in the frame central of the same.

12. A chair-base hub comprising a frame consisting of a top having standard extensions, and a bottom having like extensions alternating with those aforesaid, the standard extensions of the top being fastened to the bottom and those of said bottom to said top; and a vertical tube that is central of the frame and provided with an upper waved surface.

13. A chair-base hub comprising a frame consisting of a top having standard extensions, and a bottom having like extensions alternating with those aforesaid, the standard extensions of the top being fastened to those of the bottom and said bottom to said top; and a spline in the hub.

14. A chair-base hub comprising a frame consisting of a top having standard extensions, and a bottom having like extensions alternating with those aforesaid, the standard extensions of the top being fastened to the bottom and those of said bottom to said top; and a vertical tube that is central of the frame and provided with an indentation in the direction of its length.

15. A chair-base hub comprising a frame consisting of a top having standard extensions, and a bottom having like extensions alternating with those aforesaid, the standard extensions of the top being fastened to the bottom and those of said bottom to said top; and a vertical tube that is loose in the frame central of the same and provided with a spline.

16. A chair-base hub comprising a frame consisting of a top having standard extensions and a bottom having like extensions alternating with those aforesaid and provided with depending stiffening flanges arranged to brace all the standards, the standard extensions of the top being fastened to the bottom and those of said bottom to said top.

17. A chair-base hub comprising a frame consisting of a top having standard extensions and a bottom having like extensions alternating with those aforesaid, the standard extensions of the top being fastened to the bottom and those of said bottom to said top; and a nut-guard in connection with said frame.

18. A chair-base hub comprising a frame consisting of a top having standard extensions and depending ears, a bottom having like extensions alternating with those aforesaid and upwardly-extending ears, the standard extensions of the top being fastened to the ears of the bottom and those of said bottom to the ears of said top.

In testimony that I claim the foregoing I have hereunto set my hand, at Milwaukee, in the county of Milwaukee and State of Wisconsin, in the presence of two witnesses.

HARRY W. BOLENS.

Witnesses:
N. E. OLIPHANT,
HUGO FAHL.